Patented July 24, 1951

2,561,390

UNITED STATES PATENT OFFICE 2,561,390

METHOD OF PRODUCING MELAMINE

Johnstone S. Mackay, Old Greenwich, and Joseph H. Paden, Stamford, Conn., assignors to American Cyanamid Company, New York, N. Y., a corporation of Maine No Drawing. Application March 29, 1947, Serial No. 738,228

3 Claims. (Cl. 260—249.7)

The present invention relates to a method of producing melamine from guanidine thiocyanate and guanylthiourea.

An object of the invention is to produce melamine from guanidine thiocyanate and/or guanylthiourea by an economical method which provides high yields while requiring only short periods of time and simple apparatus and procedures.

Other objects will be apparent from the discussion that follows hereinafter.

Heretofore, heating guanidine salts to produce melamine was carried out at temperature within the range of about 180°–250° C. The yields of melamine produced were generally quite low, and, in addition, long heating periods were required to obtain such yields. Further, while the yields obtainable by heating the carbonate or hydrochloride of guanidine were appreciable, those obtained by heating guanidine thiocyanate under the above conditions were considerably lower. This represents a considerable economic disadvantage in that the latter is a much cheaper material, being readily produced from ammonium thiocyanate which is obtained in large quantities as a by-product in the coke industry. Also, large amounts of melam and possibly other thermal decomposition products of melamine were always produced in large quantities. At temperatures above 250° C. the amount of melamine provided was even less while the amount of melam was increased.

It has now been found that higher yields of melamine are provided by heating guanidine thiocyanate and/or guanylthiourea at the still higher temperatures of 350°–500° C. in a closed reaction vessel, and that such higher yields are obtained using very short periods of heating.

Apparently, the difference in results is to be accounted for by the use of a closed reaction vessel which serves to confine all of the gaseous products such as hydrogen sulfide, ammonia and carbon disulfide resulting from heating the aforesaid starting materials. Since appreciable amounts of these gases are formed in the course of such heating, considerable pressures are developed in carrying out the process in a closed reaction vessel.

While heating the aforementioned starting materials in a closed reaction vessel at temperatures below 350° C. will be found to provide some melamine, the yields so produced are too low to be attractive, being of the order of those provided using the conditions employed heretofore. Further, longer reaction periods are required in order to obtain these low yields. Apparently, at temperatures substantially below 350° C. the rate of melamine formation is too low to be of any practical merit. On the other hand, at temperatures substantially in excess of 500° C. a considerable reduction in the amount of melamine produced is likewise experienced, apparently due to its thermal decomposition at such highly elevated temperatures.

While the time of heating that should be employed in carrying out the process of the present invention may be varied to some extent without altering the results obtainable, equilibrium will be found to be quickly established at the aforesaid temperatures so that continued heating is wasteful of time and can result in some decomposition of the desired melamine. Generally, periods as short as 10 or 15 minutes will be found suitable to provide maximum yields, although periods as long as 2 hours may be employed under the same conditions without any decrease in the amount of melamine provided.

An additional advantage of the present invention resides in the fact that while much of the guanidine thiocyanate and/or guanylthiourea is decomposed in the formation of melamine, nevertheless, a considerable proportion of guanidine thiocyanate will be found unchanged in the reaction mixture. The guanidine thiocyanate is readily separated by simply leaching with cold water in view of its appreciable solubility therein, and may then be reprocessed to produce additional melamine. When the guanidine thiocyanate and/or guanylthiourea are heated at atmospheric pressure no detectable quantities of the starting materials are found to remain in the reaction mixture.

The following examples are provided to afford a more detailed description of the process of the invention.

Example 1

60 grams of guanidine thiocyanate are placed in a 300 cc. autoclave which is thereafter sealed and heated at 350° C. for 15 minutes. Thereafter the autoclave is cooled under running water, vented to release the gases and the solid product is discharged. The unconverted guanidine thiocyanate is separated from the reaction mixture by leaching with cold water and thereafter the melamine is dissolved in hot water, stirring for a period of about one hour and filtering to remove the small amount of insolubles. On concentration and cooling the two solutions of guanidine thiocyanate and melamine these two materials are provided as precipitates, and there are recovered 17.0 grams of guanidine thiocyanate and 11.5 grams of melamine.

Example 2

60 grams of guanidine thiocyanate are placed in a 300 cc. autoclave which is thereafter sealed and heated at 400° C. for 15 minutes. Thereafter the autoclave is cooled under running water, vented to release the gases and the solid product is discharged. The unconverted guanidine thiocyanate is separated from the reaction mixture by leaching with cold water and thereafter the melamine is dissolved in hot water, stirring for a period of about one hour and filtering to provide a clear solution. On concentration and cooling the two solutions of guanidine thiocyanate and melamine these two materials are provided as precipitates, and there are recovered 14.6 grams of guanidine thiocyanate and 13.0 grams of melamine.

Example 3

60 grams of guanylthiourea are placed in a 300 cc. autoclave which is thereafter sealed and heated at 350° C. for 15 minutes. Thereafter the autoclave is cooled under running water, vented to release the gases and the solid product is discharged. The unconverted guanidine thiocyanate is separated from the reaction mixture by leaching with cold water. Thereafter the melamine is dissolved in hot water, stirring for a period of about one hour and filtering. On concentration and cooling the two solutions of guanidine thiocyanate and melamine these two materials are provided as precipitates. There are recovered 14.0 grams of guanidine thiocyanate and 9.4 grams of melamine.

While the invention has been described with particular reference to specific embodiments it is not to be considered as limited thereby but rather it is to be construed solely in the light of the appended claims.

What is claimed is:

1. A process for preparing melamine consisting of heating a member of the group consisting of guanidine thiocyanate and guanylthiourea in a closed reaction vessel at a temperature within the range of substantially 350°–500° C.

2. A process for preparing melamine consisting of heating guanidine thiocyanate in a closed reaction vessel at a temperature within the range of substantially 350°–500° C.

3. A process for preparing melamine consisting of heating guanylthiourea in a closed reaction vessel at a temperature within the range of substantially 350°–500° C.

JOHNSTONE S. MACKAY.
JOSEPH H. PADEN.

REFERENCES CITED

The following references are of record in the file of this patent:

UNITED STATES PATENTS

| Number | Name | Date |
| --- | --- | --- |
| 2,164,705 | Fisch | July 4, 1939 |
| 2,287,597 | Brookes | June 23, 1942 |
| 2,396,193 | Paden | Mar. 5, 1946 |

FOREIGN PATENTS

| Number | Country | Date |
| --- | --- | --- |
| 527,697 | Great Britain | Oct. 15, 1940 |
| 533,426 | Great Britain | 1941 |

OTHER REFERENCES

Sedgwick, Organic Chemistry of Nitrogen, pp. 295–296, 1936, Oxford Press.

McClellan, Ind. and Eng. Chem., vol. 32, No. 9, Sept. 1940, p. 1183.